United States Patent [19]

Bujanowski et al.

[11] Patent Number: 5,629,095
[45] Date of Patent: May 13, 1997

[54] RADIATION CURABLE COMPOSITIONS CONTAINING VINYL ETHER FUNCTIONAL POLYSILOXANES AND METHODS FOR THE PREPARATION

[75] Inventors: Valerie J. Bujanowski; Shedric O. Glover, both of Midland; Susan V. Perz, Essexville; Maris J. Ziemelis, Midland; Gary R. Homan, Midland; Michael W. Skinner, Midland, all of Mich.

[73] Assignee: Dow Corning Corporation, Midland, Mich.

[21] Appl. No.: 443,521

[22] Filed: May 18, 1995

Related U.S. Application Data

[62] Division of Ser. No. 63,206, May 18, 1993.

[51] Int. Cl.⁶ .......................... C08L 83/02; C08L 83/07; C08G 77/20; C08G 77/08
[52] U.S. Cl. .......................... 428/447; 428/451; 428/452; 522/31; 522/57; 522/59; 522/99; 528/21; 528/23; 528/32; 528/13; 528/19; 528/15
[58] Field of Search .......................... 428/447, 451, 428/452; 522/31, 99; 528/32, 13, 15, 19, 21, 23

[56] References Cited

U.S. PATENT DOCUMENTS

| | | | |
|---|---|---|---|
| 2,807,601 | 9/1957 | Dennett | 260/42 |
| 2,985,545 | 5/1961 | Leavitt | 117/143 |
| 3,133,111 | 5/1964 | Wheeler | 260/448.8 |
| 3,900,617 | 8/1975 | Grenoble | 427/387 |
| 4,190,688 | 2/1980 | Traver et al. | 427/391 |
| 4,293,671 | 10/1981 | Sasaki et al. | 525/478 |
| 4,311,821 | 1/1982 | Weltemeyer et al. | 528/15 |
| 4,476,241 | 10/1984 | Dallavia, Jr. et al. | 502/156 |
| 4,539,232 | 9/1985 | Burzynski et al. | 528/10 |
| 4,559,396 | 12/1985 | Sasaki et al. | 528/15 |
| 4,562,096 | 12/1985 | Lo et al. | 427/208.8 |
| 4,587,136 | 5/1986 | White et al. | 427/54.1 |
| 4,609,574 | 9/1986 | Keryk et al. | 427/407.1 |
| 4,617,238 | 10/1986 | Crivello et al. | 428/452 |
| 4,707,503 | 11/1987 | Itoh et al. | 522/99 |
| 5,039,716 | 8/1991 | Vara et al. | 522/96 |
| 5,045,621 | 9/1991 | Suzuki | 528/14 |
| 5,057,549 | 10/1991 | Herzig et al. | 522/99 |
| 5,270,423 | 12/1993 | Brown et al. | 528/15 |

FOREIGN PATENT DOCUMENTS

462389A2  5/1991  European Pat. Off. ........ C08G 77/18

*Primary Examiner*—Susan W. Berman
*Attorney, Agent, or Firm*—Timothy J. Troy

[57] ABSTRACT

The present invention relates to radiation curable silicone vinyl ethers and methods for preparing silicone vinyl ethers. More particularly, the present invention relates compositions containing vinyl ether functional silicones and to the preparation and use of silicone vinyl ethers which are curable by addition of photocleavable acids and exposure to ultraviolet or electron beam radiation.

20 Claims, No Drawings ic radiation.

RADIATION CURABLE COMPOSITIONS CONTAINING VINYL ETHER FUNCTIONAL POLYSILOXANES AND METHODS FOR THE PREPARATION

This is a divisional of copending application Ser. No. 08/063,206 filed on May 18, 1993, pending.

BACKGROUND OF THE INVENTION

The present invention relates to radiation curable silicone vinyl ethers and methods for preparing silicone vinyl ethers. More particularly, the present invention relates to compositions containing vinyl ether functional silicones and to the preparation and use of silicone vinyl ethers which are curable by addition of photocleavable acids and exposure to actinic radiation.

Alkenyl ether functional organosilicon compounds have been described in the art. For example, U.S. Pat. No. 4,617,238 to Crivello discloses and claims a photopolymerizable composition comprising (a) an organopolysiloxane having at least one Si-bonded vinyloxy functional group of the formula $H_2C=CH-O-G-$, where G is alkylene (such as propylene) or alkylene interrupted by at least one divalent heteroredical selected from $-O-$, divalent phenylene, or substituted divalent phenylene, or combination of such heteroradicals, and (b) an onium salt catalyst. The '238 patent also describes a method wherein the vinyl ether group is introduced into the organopolysiloxane by addition (hydrosilylation) of compounds with an allyl and a vinyl ether group to an SiH group of the organopolysiloxane in the presence of a platinum catalyst. In the method of the '238 patent, only the allyl group is added to the SiH group while the vinyl ether group is preserved and thus only one vinyl ether group for each SiH group can be incorporated into the siloxane molecule at any given time.

U.S. Pat. No. 4,707,503 to Itoh et al. discloses unsaturated organopolysiloxanes containing at least two organosiloxane groups represented by the formula $CH_2=CR^2-X-R^1-SiR^3{}_mO_{3-m/m}$ wherein R1 is a divalent hydrocarbon group, $R^2$ is a hydrogen atom or a methyl group, $R^3$ is a substituted or unsubstituted monovalent hydrocarbon group, X is a group $-O-(CH_2)_2S-$, and m is a number of 0, 1, or 2.

U.S. Pat. No. 5,057,549 to Herzig et al. discloses alkenyloxy functional organosilicon compounds which contain at least one Si-bonded Y radical per molecule having the formula $-(CH_2)_2-R^2-(A-R^3)_z-O-CH=CH-CH_2-R^4$, wherein A denotes $-O-$, $-S-$, or $-C(O)O-$, $R^2$ denotes a linear or branched alkylene radical having from 1 to 7 carbon atoms per radical or cycloalkylene radical having from 5 to 7 carbon atoms per radical, $R^3$ denotes a linear or branched alkylene radical having from 2 to 4 carbon atoms per radical, which may be substituted by a hydroxyl group, methoxy group, ethoxy group, or trimethylsiloxy group, $R^4$ denotes a hydrogen atom or an alkyl radical having from 1 to 4 carbon atoms per radical, and z has a value of 0, 1, or 2. The alkenyloxy-functional organopolysiloxanes can be crosslinked for example with ultraviolet light and can be used for preparing coatings. The '549 patent further discloses that the alkenyloxy functional organosilicon compounds are prepared by reacting compounds of the formula $CH_2=CH-R^2-(AR^3)_z-OCH_2-CH=CH-R^4$ with an organosilicon compound having at least one Si-bonded hydrogen atom in the presence of a hydrosilylation catalyst, followed by a second step which effects the transfer of the carbon-carbon double bond to the carbon bonds beside the ether oxygen.

European Patent Publication No. 0462389 teaches thermosetting organopolysiloxanes with oxyalkylene vinyl ether groups bonded by SiOC groups and the vinyl groups may be substituted by alkyl radicals. EPO '389 also teaches a method for the preparation of these compounds and their application as photochemically thermosetting polysiloxanes in encapsulating compounds, as non-stick coating compounds for flat carriers or as modified additives in compounds which can be thermoset radically, cationically or by UV or electron radiation.

Another vinyl ether functional silicone is described in U.S. Pat. No. 5,039,716 to Vara et al. which discloses alk-1-enyl ether silicates having the formula $[X]_{4-n}Si[OR^1OCH=CH-R^2]_n$ wherein X is a halogen or $-OR$ wherein R is lower alkyl or a mixture of halogen and OR, a mixture of OR and hydrogen or a mixture of halogen and hydrogen, $R^1$ contains from 1 to 8 carbon atoms and is alkylene, alkenylene, alkynylene, optionally alkoxylated with up to 20 units of

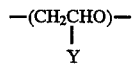

wherein Y is hydrogen or methyl and $R^2$ is each hydrogen or lower alkyl and n has a value of 1 to 4. The '716 patent also discloses a process for preparing vinyl ether silicates.

The methods described hereinabove which rely on competition between the vinyl ether group and other alkenyl groups on the same compound do not result in conversion of SiH to vinyl ether. In contrast, the method of the present invention results in the quantitative conversion of siloxanes to vinyl ether, the preferred radiation sensitive group.

SUMMARY OF THE INVENTION

In accordance with the present invention a novel process for preparing silicone vinyl ethers has been discovered. The present invention further relates to novel silicone vinyl ether compounds.

The present invention relates to a method of making a vinylether functional siloxane, the method comprising the steps of: (I) reacting (a) a silane having the formula $R_xSi(OR^1)_{4-x}$; (b) water; and (c) an acidic condensation catalyst, wherein R is a monovalent hydrocarbon or halohydrocarbon radical having from 1 to 20 carbon atoms, $R^1$ is a monovalent alkyl radical having from 1 to 8 carbon atoms, x has a value of from 0 to 3, with the proviso that the molar ratio of water to alkoxy radicals is less than 0.5; (II) removing alcohol from the mixture of step (I); (III) neutralizing the mixture of step (II); (IV) adding a vinyl ether compound having the formula $HOR^2OCH=CH_2$ wherein $R^2$ is a divalent hydrocarbon or halohydrocarbon radical having from 1 to 20 carbon atoms to the mixture of step (III); (V) adding a transesterification catalyst to the mixture of step (IV); and (VI) removing volatiles from the mixture of step (V).

The present invention also relates to an alternative method of making a vinylether functional siloxane, the method comprising the steps of: (I) reacting in the presence of a non-acidic equilibration catalyst (a) a cyclic compound having the formula

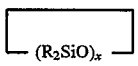

and (b) a compound having the formula HOR$^1$OCH=CH$_2$, wherein R is a monovalent hydrocarbon radical or halohydrocarbon radical having from 1 to 20 carbon atoms, R$^1$ is a divalent hydrocarbon or halohydrocarbon radical having from 1 to 20 carbon atoms, and x has a value of from 3 to 10; (II) removing volatiles from the mixture of step (I); and (III) neutralizing the mixture of step (II). The present invention further relates to novel vinylether functional polysiloxane compounds. The present invention further relates to a curable composition comprising the novel vinylether functional polysiloxane compound hereinabove in combination with a photocleavable acid. This invention also relates to a method of making a curable composition, the method comprising the steps of (I) applying the curable composition to a solid substrate to form a coating; and (II) exposing the coating to an energy source selected from the group consisting of (i) actinic radiation and (ii) actinic radiation in combination with heat in an amount sufficient to cure the coating. It is an object of the present invention to provide a novel method of preparing vinyl ether functional siloxanes.

It is another object of the present invention to provide a novel method of preparing UV or EB curable organopolysiloxanes suitable for pressure sensitive adhesive release applications.

It is a further object of this invention to provide novel silicone vinyl ether compounds.

It is also an object of the present invention to produce silicone vinyl ether copolymers or oligomers which are curable by addition of photocleavable acids and exposure to UV (ultraviolet) or EB (electron beam) radiation.

It is a further object of this invention to provide UV-curable silicone compositions which may be catalyzed by a variety of curing catalysts.

It is a further object of this invention to provide novel UV curable vinyloxy polysiloxane compositions having especially rapid cure rates.

These and other features, objects, and advantages of the present invention will be apparent upon consideration of the following detailed description of the invention.

DETAILED DESCRIPTION OF THE INVENTION

Thus the present invention relates to a method comprising the steps of (I) reacting (a) a silane having the formula R$_x$Si(OR$^1$)$_{4-x}$, (b) water, and (c) an acidic condensation catalyst, wherein R is a monovalent hydrocarbon or halohydrocarbon radical having from 1 to 20 carbon atoms, R$^1$ is a monovalent alkyl radical having from 1 to 8 carbon atoms, x has a value of from 0 to 3, with the proviso that the molar ratio of water to alkoxy radicals is less than 0.5, (II) removing alcohol from the mixture of step (I), (III) neutralizing the mixture of step (II), (IV) adding a vinyl ether compound having the formula HOR$^2$OCH=CH$_2$ wherein R$^2$ is a divalent hydrocarbon or halohydrocarbon radical having from 1 to 20 carbon atoms to the mixture of step (III); (V) adding a transesterification catalyst to the mixture of step (IV); and (VI) removing volatiles from the mixture of step (V).

Step (I) in the method of the present invention comprises reacting a silane having the formula R$_x$Si(OR$^1$)$_{4-x}$ with water and an acidic condensation catalyst. The silane in the method of the present invention is a silane having the formula R$_x$Si(OR$^1$)$_{4-x}$ wherein R is a monovalent hydrocarbon or halohydrocarbon radical having from 1 to 20 carbon atoms, R$^1$ is a monovalent alkyl radical having from 1 to 8 carbon atoms, and x has a value from 0 to 3. It is also required in the method of this invention that the molar ratio of water to alkoxy radicals is less than 0.5.

In the formula shown immediately above each R denotes a monovalent hydrocarbon radical having from 1 to 20 carbon atoms. Monovalent hydrocarbon radicals include alkyl radicals, such as methyl, ethyl, propyl, butyl, hexyl, and octyl; cycloaliphatic radicals, such as cyclohexyl; aryl radicals, such as phenyl, tolyl, and xylyl; aralkyl radicals, such as benzyl and phenylethyl; and olefinic hydrocarbon radicals, such as vinyl, allyl, methallyl, butenyl, and hexenyl, octenyl, cyclohexenyl and styryl. Alkenyl radicals are preferably terminally unsaturated. Highly preferred monovalent hydrocarbon radical for the silane in the method of this invention are methyl, phenyl, vinyl, and 5-hexenyl. Monovalent halohydrocarbon radicals free of aliphatic unsaturation include any monovalent hydrocarbon radical noted above which has at least one of its hydrogen atoms replaced with a halogen, such as fluorine, chlorine, or bromine. Preferred monovalent halohydrocarbon radicals have the formula C$_n$F$_{2n-1}$CH$_2$CH$_2$— wherein the subscript n has a value of from 1 to 8, such as, for example, CF$_3$CH$_2$CH$_2$— and C$_4$F$_9$CH$_2$CH$_2$—. The several R radicals can be identical or different, as desired. R$^1$ in the method of the present invention is a monovalent alkyl radical having from 1 to 8 carbon atoms which include alkyl radicals such as methyl, ethyl, propyl, butyl, hexyl, and octyl. The amount of silane employed in the method of the present invention varies depending on the amount of water and condensation catalyst employed. It is preferred for purposes of this invention that from 50 to 99 weight percent of silane be used, and it is highly preferred that from 85 to 95 weight percent of silane be employed, said weight percent being based on the total weight of the composition.

Water is also included in the mixture of step (I), preferably clear water, and most preferably distilled and/or deionized water. It is preferred for purposes of this invention that from 1 to 50 weight percent of water be used, and it is highly preferred that from 5 to 15 weight percent of water be employed, said weight percent being based on the total weight of the composition.

The acidic condensation catalysts suitable for use in Step (I) of this invention include condensation catalysts having a pH of less than 7. Examples of the acidic condensation catalysts suitable for the condensation reaction in the method of the present invention include but are not limited to hydrochloric acid (HCl), H$_2$SO$_4$, sulfonic acids, H$_3$PO$_4$, (PNCl$_2$)$_x$, acid anhydrides, acid clays, ion exchange resins, RCOCl, and (RCO)$_2$O, wherein R is a monovalent hydrocarbon or halohydrocarbon radical having from 1 to 20 carbon atoms such as methyl. It is preferred for purposes of this invention that the condensation catalyst is selected from the group consisting of hydrochloric acid, $H_2SO_4$, and sulfonic acids. The amount of acidic condensation catalyst needed for the method of the present will be determined by the skilled artisan through routine experimentation. Typically, this component is employed at a level of about 0.1 to about 5 weight percent, preferably 0.1 to 1 weight percent, said weight percent being based on the total weight of the composition.

As stated hereinabove, it is required in the method of this invention that the molar ratio of water to alkoxy radicals is less than 0.5. It is highly preferred that this molar ratio be from 0.1 to 0.4.

Step (II) in the method of the present invention comprises removing alcohol from the reaction mixture of step (I). Methods of removing volatile components are well known in the art and need no extensive delineation herein. Any method of removing volatile components can be used in the present invention, such methods exemplified by, but not limited to, heating and/or application of a vacuum, molecular stills, rotoevaporators, and wipe film evaporators, with the preferred method being wipe film evaporators. It is preferred in the method of the present invention that the alcohol in Step (I) be removed by heating the mixture to a temperature of above 80° C.

Step (III) in the method of the present invention comprises neutralizing the mixture of step (II). Neutralization of acidic mixtures is well known in the art and needs no extensive delineation herein. It is preferred in the method of the present invention that the mixture of step (II) be neutralized by adding a basic compound to it such as sodium bicarbonate ($NaHCO_3$), calcium carbonate ($CaCO_3$), $Na_2CO_3$, $(NH_4)_2CO_3$, $CO_2$, $H_2O$, and a filter aid such as diatomaceous earth.

Step (IV) in the method of the present invention comprises adding a vinyl ether compound having the formula $HOR^2OCH=CH_2$ wherein $R^2$ is a divalent hydrocarbon or halohydrocarbon radical having from 1 to 20 carbon atoms to the neutralized mixture of step (III).

In the formula immediately above $R^2$ is a divalent hydrocarbon or halohydrocarbon radical having from 1 to 20 carbon atoms. Divalent hydrocarbon radicals suitable as $R^2$ are exemplified by alkylene radicals, such as methylene, ethylene, trimethylene, 2-methyltrimethylene, pentamethylene, hexamethylene, 3-ethylhexamethylene, octamethylene, —$CH_2(CH_3)CH$—, —$(CH2)_4$—, —$CH_2CH(CH_3)CH_2$—, and —$(CH_2)_{18}$—; cycloalkylene radicals such as cyclohexylene; arylene radicals such as phenylene, and combinations of divalent hydrocarbon radicals such as benzylene, i.e. —$C_6H_4CH_2$—.

Examples of suitable divalent halohydrocarbon radicals include any divalent hydrocarbon radical wherein one or more hydrogen atoms have been replaced by halogen, such as fluorine, chlorine or bromine. Preferably divalent halohydrocarbon radicals have the formula —$CH_2CH_2C_nF_{2n}CH_2CH_2$— wherein n has a value of from 1 to 10 such as for example —$CH_2CH_2CF_2CF_2CH_2CH_2$—. Preferably $R^2$ in is an alkylene radical having from 1 to 8 carbon atoms such as methylene, ethylene, propylene, butylene, hexylene, and cyclohexyldimethylene.

The amount of vinyl ether compound employed in the method of the present invention varies depending on the amount of silane, water and condensation catalyst employed. It is preferred for purposes of this invention that from 5 to 90 weight percent of vinyl ether be used, and it is highly preferred that from 15 to 50 weight percent of vinyl ether be employed, said weight percent being based on the total weight of the composition.

Step (V) in the method of the present invention comprises adding a transesterification catalyst to the mixture of step (IV). Suitable transesterification catalysts have been described for example in U.S. Pat. No. 3,133,111 which is incorporated herein by reference and have been described in other publications and include alkali metal alkoxides, Sn compounds, Ti compounds, Ba compounds, as well as standard strong alkali compounds. Strong acid compounds are to be avoided as they tend to polymerize oxyalkenyl groups. Examples of suitable transesterification catalysts include dimethyltin neodecanoate, dibutyltin diacetate, dibutyltin dilaurate, dioctyltin dilaurate, dibutyltin dioctoate, zinc napthenate, cobalt napthenate, zinc octylate, tin octylate, cobalt octylate, diisooctyl mercaptoacetate, zirconium napthenate, zirconium octylate, tetrabutyl orthotitanate, tetraisopropyl titanate, barium hydroxide monohydrate, stannous octoate, and other organic metal catalysts. It is preferred for purposes of this invention that the transesterification catalyst be selected from alkali metal alkoxides such as tetraisopropyl titanate, barium hydroxide monohydrate, and sodium methoxide. The amount of catalyst needed for the method of the present will be determined by the skilled artisan through routine experimentation. Typically, this component is employed at a level of about 0.1 to about 5 weight percent, preferably 0.1 to 3 weight percent, said weight percent being based on the total weight of the composition.

Step (VI) in the method of the present invention comprises removing volatiles from the mixture of Step (V). Methods of removing volatile components are well known in the art and need no extensive delineation herein. Any method of removing volatile components can be used in the present invention, such methods exemplified by, but not limited to, molecular stills, rotoevaporators, and wipe film evaporators, with the preferred method being wipe film evaporators.

The method of the present invention can further comprise heating the mixture after step (I). By heat it is meant infrared radiation, hot-air, microwave radiation, etc. It is preferred for the method of the present invention that the mixture resulting from Step (I) be heated from room temperature to a temperature of less than about 150° C., and it is highly preferred that the mixture resulting from step (I) be heated at a temperature of from 50° to 85° C.

The method of the present invention can further comprise adding a polydiorganosiloxane. The polydiorganosiloxane preferably is a compound having the formula $HOSiR^3_2O(R^3_2SiO)_nSiR^3_2OH$ wherein $R^3$ is selected from the group consisting of a monovalent hydrocarbon or halohydrocarbon radical having from 1 to 20 carbon atoms and hydrogen, and n has a value from 0 to 15,000. The monovalent hydrocarbon and halohydrocarbon radicals suitable as $R^3$ in the method of this invention are as delineated above for R in Step (I). It is preferable that the polyorganosiloxane be added prior to Step (IV).

In a preferred embodiment of the present invention, the polydiorganosiloxane is a hydroxyl-endblocked polydimethylsiloxane having the formula $HOMe_2SiO(Me_2SiO)_nSiMe_2OH$ wherein n has a value of from 10 to 60.

The polyorganosiloxanes are well known in the silicone art and needs no detailed delineation herein. Suitable hydroxyl-endblocked polydiorganosiloxanes are disclosed for example, in U.S. Pat. Nos. 2,807,601,; 2,985,545; 3,900,617; 4,190,688; 4,293,671; 4,476,241; 4,559,396; 4,562,096; 4,587,136 and 4,609,574 which are included herein by reference to further delineate hydroxyl end-blocked polydiorganosiloxanes and how to make them. It is preferable that about 10 to 80 weight percent of hydoxyl-endblocked polydiorganosiloxane be employed in the method of this invention. It is highly preferred for purposes of the present invention that 25 to 50 weight percent of hydroxyl-endblocked polydiorganosiloxane be employed, said weight percent being based on the total weight of the composition.

The method of the present invention can further comprise adding an alcohol having the formula $R^4OH$, wherein $R^4$ is is a monovalent hydrocarbon or halohydrocarbon radical having from 1 to 20 carbon atoms. The monovalent hydrocarbon and halohydrocarbon radicals suitable as $R^4$ in the method of this invention are as delineated above for R in Step (I). It is preferred in the process of the instant invention that the alcohol be added after step (I). It is preferable that about 1 to 50 weight percent of alcohol be used in the instant method and it is highly preferred for purposes of the present invention that 10 to 30 weight percent of alcohol be used, said weight percent being based on the total weight of the composition.

The present invention further relates to an alternative method of making a vinylether functional siloxane, the method comprising the steps of: (I) reacting: (a) a silane having the formula $R_xSi(OR^1)_{4-x}$; (b) water; (c) a non-acidic condensation catalyst; and (d) a vinyl ether compound having the formula $HOR^2OCH=CH_2$ wherein R is a monovalent hydrocarbon or halohydrocarbon radical having from 1 to 20 carbon atoms, $R^1$ is a monovalent alkyl radical having from 1 to 8 carbon atoms, $R^2$ is a divalent hydrocarbon or halohydrocarbon radical having from 1 to 20 carbon atoms x has a value of from 0 to 3, with the proviso that the molar ratio of water to alkoxy radicals is less than 0.5; (II) removing alcohol from the mixture of step (I); (III) neutralizing the mixture of (II); (IV) adding a transesterification catalyst to the mixture of (III); and (V) removing volatiles from the mixture of step (IV).

In this alternative method the silane, water, vinyl ether compound of step (I) are as delineated above for the method of making the vinylether functional siloxanes of the present invention, including amounts and preferred examples thereof. Steps (II) through (V) in the instant alternative method are also as delineated above for the method of making the vinylether functional siloxanes of the present invention, including amounts and preferred examples thereof.

The non-acidic condensation catalysts suitable for use in Step (I) of this invention include basic and neutral condensation catalysts, or those having a pH of 7 or a pH of greater than 7. Examples of the non-acidic condensation catalysts suitable for the condensation reaction in this method of the present invention include neutral condensation catalysts such as heat, amine carboxylates, heavy metals carboxylates, isocyanates. Also suitable for the non-acidic condensation catalyst in this method of the invention are basic condensation catalysts such as silanolates, phenoxides, mercaptides, CaO, BaO, LiOH, BuLi, amines, ammonium hydroxides. It is preferred for purposes of this invention that the non-acidic condensation catalyst is selected from the group consisting of silanolates and ammonium hydroxides.

The amount of non-acidic condensation catalyst needed for the method of the present invention will be determined by the skilled artisan through routine experimentation. Typically, this component is employed at a level of about 0.001 to about 0.5 weight percent, preferably 0.02 to 0.2 weight percent, said weight percent being based on the total weight of the composition.

The instant method can further comprise adding an endcapping agent prior to step (III). Preferably the endcapping agent is a compound having the formula $R^3_3SiQSiR^3_3$, wherein $R^3$ is a monovalent hydrocarbon radical or halohydrocarbon radical having from 1 to 20 and Q is a heteroradical selected from the group consisting of oxygen, and nitrogen. The monovalent hydrocarbon and halohydrocarbon radicals suitable as $R^3$ in this method of the invention are as delineated in the methods delineated above including preferred embodiments thereof. Preferred endcapping agents for the instant method also include compounds which contain —$SiMe_3$ groups or —$SiMe_2R$ groups wherein R is a group selected from phenyl, vinyl, hexenyl, trifluoropropyl, and hydroxyl, but are not limited thereto. Especially preferred endcapping agents for this method of the invention include hexamethyldisilazane, hexamethyldisiloxane, $Me_3SiO(Me_2SiO)_2SiMe_3$, $XMe_2SiO(Me_2SiO)_2SiMe_2X$, wherein X is selected from the group consisting of vinyl, phenyl, trifluoropropyl, hexenyl, and a halogen.

The amount of endcapping agent needed for the method of the present invention will be determined by the skilled artisan through routine experimentation. Typically, this component is employed at a level of about 25 to about 75 weight percent, preferably 40 to 60 weight percent, said weight percent being based on the total weight of the composition.

The method of the present invention can further comprise heating the mixture after step (I). Heating in this method of the invention is as delineated in the method above including preferred temperatures and methods of applying heat.

The method of the present invention can further comprise adding a polydiorganosiloxane prior to step (III). The polydiorganosiloxane is preferably a hydroxyl-endblocked polydiorganosiloxane and is as delineated in the method above including amounts and preferred embodiments thereof.

The present invention also relates to an additional method of making a vinylether functional siloxane, the method comprising the steps of: (I) reacting in the presence of a non-acidic equilibration catalyst (a) a cyclic compound having the formula

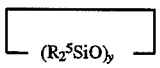

and (b) a compound having the formula $HOR^6OCH=CH_2$ wherein $R^5$ is a monovalent hydrocarbon radical or halohydrocarbon radical having from 1 to 20 carbon atoms, $R^6$ is a divalent hydrocarbon or halohydrocarbon radical having from 1 to 20 carbon atoms, and y has a value of from 3 to 10, (II) removing volatiles from the mixture of (I); and (III) neutralizing the mixture of (II).

Step (I) in this method of the invention comprises reacting (a) a cyclic compound having the formula

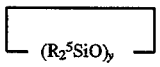

(b) a compound having the formula $HOR^6OCH=CH_2$ wherein $R^5$ is a monovalent hydrocarbon radical or halohydrocarbon radical having from 1 to 20 carbon atoms, $R^6$ is a divalent hydrocarbon or halohydrocarbon radical having from 1 to 20 carbon atoms, and y has a value of from 3 to 10 in the presence of a non-acidic equilibration catalyst. The monovalent hydrocarbon and halohydrocarbon radicals of $R^5$ are as delineated above in the other methods of this invention including amounts and preferred embodiments thereof. The divalent hydrocarbon or halohydrocarbon radicals of $R^6$ are also as delineated above in the other methods of this invention including amounts and preferred embodiments thereof.

Suitable non-acidic equilibration catalysts for this method of the invention include catalysts such as heat, amine carboxylates, heavy metals carboxylates, isocyanates. Also suitable for the non-acidic equilibration catalyst in this method of the invention are catalysts such as silanolates, phenoxides, mercaptides, CaO, BaO, LiOH, BuLi, and amines, potassium hydroxides, cesium hydroxides, ammonium hydroxides, and phosphorus hydroxides. It is preferred for purposes of this invention that the non-acidic equilibration catalyst is selected from the group consisting of silanolates and ammonium hydroxides. It is preferred that the silanolates are selected from potassium silanolates and sodium silanolates. The amount of non-acidic equilibration catalyst needed for this method of the invention will be determined by the skilled artisan through routine experimentation. Typically, this component is employed at a level of about 0.1 to about 5 weight percent, preferably 0.1 to 3 weight percent, said weight percent being based on the total weight of the composition.

Step (II) in this method of the invention comprises removing volatiles from the mixture of step (I). Methods of removing volatile components are as delineated in the methods above including preferred methods thereof.

Step (III) in the method of the present invention comprises neutralizing the mixture of step (II). Methods of neutralizing mixtures are as delineated above including preferred method thereof. It is preferred however in this method that the mixture of step (III) be neutralized by adding carbon dioxide or acetic acid followed by filtration to remove salt by-products.

This method of the present invention can further comprise heating the mixture after step (I). Heating in this method of the invention is as delineated in the methods above including preferred temperatures and methods of applying heat.

The method of the present invention can further comprise adding a polydiorganosiloxane prior to step (III). The polydiorganosiloxane is preferably a hydroxyl-endblocked polydiorganosiloxane and is as delineated in the methods above including amounts and preferred embodiments thereof.

The method of this invention can further comprise adding a silane having the formula $R^7_cSi(OR^8)_{4-c}$ prior to Step (III). In the formula above $R^7$ is a monovalent hydrocarbon or halohydrocarbon radical having from 1 to 20 carbon atoms, $R^8$ is a monovalent alkyl radical having from 1 to 8 carbon atoms, and c has a value from 0 to 3. The silane in this method of the invention is as delineated above for the silane in the other methods of this invention including amounts and preferred embodiments thereof.

The present invention further relates to a random siloxane copolymer composition having the general formula:

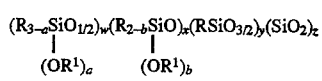

wherein R is a monovalent hydrocarbon radical or halohydrocarbon radical having from 1 to 20 carbon atoms, $R^1$ is a monovalent hydrocarbon or halohydrocarbon radical having from 1 to 8 carbon atoms, or is a compound having the formula $R^2OCH=CH_2$ wherein $R^2$ is a divalent hydrocarbon or halohydrocarbon radical having from 1 to 20 carbon atoms, w has a mole percent of from greater than 0 to 100, x has a mole percent of from 0 to less than 100, y has a mole percent of from 0 to less than 100, z has a mole percent of from 0 to less than 100, a is an integer of from 0 to 3, b is an integer of from 0 to 2, the sum of w+x+y+z being equal to 100 mole percent, with the proviso that at least one $R^2OCH=CH_2$ group exists in each molecule.

The siloxane copolymer of the present invention thus is comprised of siloxane units of the formula

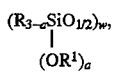

siloxane units of the formula

siloxane units of the formula $(RSiO_{3/2})_y$, and siloxane units of the formula $(SiO_2)_z$ with the molar ratios defined in the formula hereinabove.

The monovalent hydrocarbon and halohydrocarbon radicals and the divalent hydrocarbon or halohydrocarbon radicals in the siloxane polymer of the instant invention are as delineated above in the methods of this invention including preferred embodiments thereof. It is preferred in the instant invention that w has a mole percent of from 5 to 90, x has a mole percent of from 0 to 75, y has a mole percent of from 0 to 40, and z has a mole percent of from 0 to 10. It is further preferred that the molecular weight of said composition be controlled to deliver a solvent-free viscosity of from 20 cps to 2000 cps at 22° C.

The present invention is further directed to a curable coating composition comprising (A) the siloxane copolymer delineated above and (B) a photocleavable acid. Suitable photocleavable acids for the compositions of the present invention include onium salts and certain nitrobenzyl sulfonate esters. Preferred for the compositions of this invention are onium salts having the formulae $R_2O^+MX_n^-$, $R_3S^+MX_n^-$, $R_3Se^+MX_n^-$, $R_4P^+MX_n^-$, and $R_4N^+MX_n^-$, wherein R is the same or different organic radicals having from 1 to 30 carbon atoms, including aromatic carbocyclic radicals of from 6 to 20 carbon atoms which can be substituted with from 1 to 4 monovalent hydrocarbon radicals selected from alkoxy radicals having from 1 to 8 carbon atoms, alkyl radicals having from 1 to 8 carbon atoms, nitro, chloro, bromo, cyano, carboxy, mercapto, and aromatic heterocyclic radicals including pyridyl, thiophenyl, pyranyl, etc. The symbol M in the formulae hereinabove are metals or metalloids which include transition metals such as such as Sb, Fe, Sn, Bi, Al, Ga, In, Ti, Zr, Sc, V, Cr, Mn, Cs, rare earth metals such as the lanthanides, for example, Cd, Pr, Nd, etc., and metalloids such as B, P, As, etc. $MX_n^-$ is a non-basic, non-nucleophilic anion, such as $BF_4—$, $PF_6—$, $AsF_6—$, $SbF_6—$, $SbCl_6—$, $HSO_4—$, $ClO_4—$, $FeCl_4=$, $SnCl_6—$, $BiCl_5=$, and the like.

Bis-diaryl iodonium salts, such as bis(dodecyl phenyl) iodonium hexafluoroarsenate and bis(dodecylphenyl) iodonium hexafluoroantimonate, and dialkylphenyl iodonium hexafluoroantimonate are preferred.

Nitrobenzyl sulfonate esters which are useful as photocleavable acids in the compositions of the present invention have the general formula

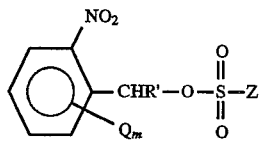

wherein Z is selected from the group consisting of alkyl groups, aryl groups, alkylaryl groups, halogen substituted alkyl groups, halogen substituted aryl groups, halogen substituted alkylaryl groups, nitro substituted aryl groups, nitro substituted alkylaryl groups, aryl groups having nitro and halogen substituents, alkylaryl groups having nitro and halogen substituents, and a group having the formula $C_6H_4SO_3CHR'C_6H_{4-m}Q_m(NO)_2$, R' is selected from the group consisting of hydrogen, methyl, and nitro substituted aryl groups, each Q is independently selected from the group consisting of hydrocarbon groups, hydrocarbonoxy groups, $NO_2$, halogen atoms, and organosilicon compounds, m has a value of 0, 1, or 2, with the proviso that Q is not an acidic group. These nitrobenzyl sulfonate photocleavable acids are described in copending U.S. application for patent, Ser. No. 976,111, filed Nov. 13, 1992, which is incorporated herein by reference. A preferred nitrobenzyl derivative for the process of the present invention is where m has a value of 1, Q denotes a $NO_2$ group in the ortho position in relation to the —CHR'OS(O)$_2$Z group, and Z denotes a nitrophenyl group, wherein the nitro group is in the para position relative to the sulphonic group, or Z denotes a phenylmethyl group, or a trifluoropropylmethylphenyl group.

It is preferred for purposes of this invention that from 90 to 99.9 weight percent of the random siloxane copolymer be used in the compositions of the invention, and it is highly preferred that from 97 to 99 weight percent of this composition be employed, said weight percent being based on the total weight of the composition.

The photocleavable acids may be present in any proportions which effect curing in the process of this invention. For purposes of the present invention, preferably the amount of photocleavable acid is from 0.1 to 10 percent by weight based on the total weight of the composition, and it is highly preferred to use between 1 and 5 percent by weight based on the total weight of the composition.

The present invention further relates to a method of making a curable composition comprising the steps of (I) applying a composition comprising (a) a random siloxane polymer and (b) a photocleavable acid to a solid substrate to form a coating, and (II) exposing the coating to an energy source selected from the group consisting of (i) actinic radiation and (ii) actinic radiation in combination with heat in an amount sufficient to cure the coating. The random siloxane polymer and photocleavable acid are as delineated above for the compositions of the present invention including preferred embodiments thereof.

In a preferred embodiment of the instant process the solid substrate is a flexible sheet material such as paper, polyolefin film and polyolefin-coated paper or foil. Other suitable solid substrates that can be coated by the process of this invention include other cellulosic materials such as wood, cardboard and cotton; metallic materials such as aluminum, copper, steel and silver; siliceous materials such as glass and stone; and synthetic polymer materials such as polyolefins, polyamides, polyesters and polyacrylates. As to form, the solid substrate can be substantially sheet-like, such as a peelable release liner for pressure sensitive adhesive; a fabric or a foil; or substantially three-dimensional in form.

Step (II) in this method of the present invention comprises exposing the coating to an energy source selected from the group consisting of (i) actinic radiation and (ii) actinic radiation in combination with heat in an amount sufficient to cure the coating. By actinic radiation it is meant ultraviolet light; electron beam radiation; and alpha-, beta-, gamma- and x-rays. By heat it is meant infrared radiation, hot-air, microwave radiation, etc. Of course actinic radiation is frequently accompanied by heat and the use of a combination of the two falls within the scope and spirit of the present invention.

Herein the term "cure", as applied to the compositions and processes of this invention, generally denotes a chemical change which leads to a change in the state of the composition from a liquid to a solid. Curing itself may be achieved in any of the known ways, including passing a coated substrate under the desired source of radiation, for example a UV lamp, at a predetermined rate and exposing a completely coated substrate to radiation by switching on the required energy source for a predetermined time.

In a preferred embodiment of the process of this invention, a flexible sheet material, such as paper, metal foil or tapestock, is coated with a thin coating of the liquid curable composition, preferably in a continuous manner and the thus-coated material is then heated and/or irradiated to rapidly cure the coating, to provide a sheetlike material bearing on at least one surface thereof an adhesive-releasing coating. The adhesive-releasing coating is subsequently brought into contact with a pressure sensitive adhesive, preferably in an in-line manner, to form an article having a peelable, i.e. releasable, adhesive/coating interface. Examples of such an article include, adhesive labels having a peelable backing, adhesive tape in roll form and adhesive packaged in a strippable container. The pressure sensitive adhesive can be non-silicone-based, such as the well-known acrylic or rubber types or silicone-based, such as the peroxide- or platinum-curable polydiorganosiloxane-based adhesives.

The methods and compositions of this invention are also applicable to adhesive materials other than pressure sensitive adhesives. Examples of said adhesive materials include foods, asphalt and gum polymers. The compositions of the present invention are useful as release coatings for pressure sensitive adhesives, as protective coatings and decorative coatings.

The compositions prepared in the method and process of this invention and the curable coating compositions of this invention can contain any optional components such as photosensitizers, high release additives, reinforcing and extending fillers, hydrocarbons and halohydrocarbons, colorants, dyes, preservatives, fragrances, stabilizers, adhesion modifiers, adhesive-release modifiers, diluents, etc.

The method and process of this invention can be completed by mixing the materials described hereinabove and any optional components in the order delineated above, using any suitable mixing means, such as a spatula, a drum roller, a mechanical stirrer, a three-roll mill, a sigma blade mixer, a bread dough mixer, and a two-roll mill. In the process of this invention, the coating method can be accomplished by any suitable manner known in the art, such as by spreading, brushing, extruding, spraying, gravure, kiss-roll and air-knife.

The following examples are disclosed to further teach, but not limit, the invention which is properly delineated by the appended claims. All amounts (parts and percentages) are by weight unless otherwise indicated. The structures presented in the examples are expressed in mole percents unless otherwise indicated.

Cure time for a composition means the time interval required for the composition, when coated onto S2S kraft paper or polypropylene film, at a thickness of 1 pound silicone per ream of paper or film, to attain the no smear, no migration, no rub-off condition.

The no smear condition was determined by lightly streaking the coating with a finger and observing for the absence of haze in the streaked area.

The no migration condition was determined by firmly adhering a common, pressure sensitive adhesive tape to the coating, removing the tape and folding the removed tape together, adhesive surfaces to each other. Absence of migration of the coating to the tape was indicated by noting that the doubled tape was as difficult to separate as unused tape so doubled.

The no rub-off condition was determined by vigorously rubbing the coating with the index finger and noting that the coating could not be removed from the paper.

RMS (Root Mean Square—i.e. the square root of the arithmetic mean of the squares of a set of numbers (an average value)) was measured on a high speed peel tester, and SAS (Subsequent Adhesive Strength) was measured on a low speed peel tester.

EXAMPLE 1

A 3-neck 100 ml flask equipped with a thermometer, magnetic stirrer, short path still, and nitrogen purge was charged with 10.95 g (0.0805 moles) $MeSi(OMe)_3$, 53.62 g (0.7246 moles) $(Me_2SiO)_x$, 10.36 g (0.0893 moles) hydroxybutylvinylether and 0.124 g potassium silanolate (1500NE (Neutralization Equivalent)). The flask was heated to 130° C. for 4 hours during which time methanol by-product was taken off. After cooling to room temperature, 0.0074 g (0.12 mmoles) glacial acetic acid was added and the mixture stirred 24 hours. The reaction product was filtered through diatomaceous earth and then stripped at 128C/1 mmHg for 1 hour. The composition produced had the following average structure

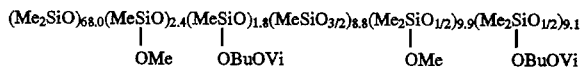

EXAMPLE 2

A 3-neck 100 ml flask equipped with a thermometer, magnetic stirrer, short path still, and nitrogen purge was charged with 8.87 g (0.0652 moles) $MeSi(OMe)_3$, 43.43 g (0.5869 moles) $(Me_2SiO)_x$, 22.71 g (0.1958 moles) hydroxybutylvinylether and 0.1 g potassium silanolate (1500NE). The flask was heated to 130° C. for 4 hours during which time methanol by-product was taken off. After cooling to room temperature, 0.0060 g (0.10 mmoles) glacial acetic acid was added and the mixture stirred 16 hours. The reaction product was filtered through diatomaceous earth and then stripped at 125 C/1 mm Hg for 2 hours. The composition produced had the following average structure

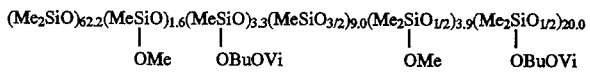

EXAMPLE 3

A 3-neck 100 ml flask equipped with a thermometer, magnetic stirrer, short path still, and nitrogen purge was charged with 2.09 g (0.0154 moles) $MeSi(OMe)_3$, 67.64 g (0.9140 moles) $(Me_2SiO)_x$, 5.36 g (0.0462 moles) hydroxybutylvinylether and 0.134 g potassium silanolate (1500NE). The flask was heated to 130° C. for 4 hours during which time methanol by-product was taken off. After cooling to room temperature, 0.0080 g (0.134 mmoles) glacial acetic acid was added and the mixture stirred 16 hours. The reaction product was filtered through diatomaceous earth and then stripped at 117 C/1 mm Hg for 1 hour. The composition produced had the following average structure

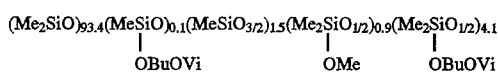

EXAMPLE 4

A 3-neck 100 ml flask equipped with a thermometer, magnetic stirrer, short path still, and nitrogen purge was charged with 74.03 g (1.0 mole) (Me$_2$SiO)$_x$ and 2.31 g (0.02 moles) hydroxybutylvinylether. The flask was heated to 130° C. and then 0.14 g potassium silanolate (1500NE) added. Heating was continued for 4 hours. After cooling to room temperature, 0.0085 g (0.14 mmoles) glacial acetic acid was added and the mixture stirred 5 hours. The reaction product was filtered through diatomaceous earth and then stripped at 125 C/1 mm Hg for 1½ hours. The composition produced had the following average structure (in moles):

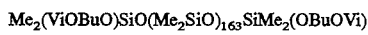

EXAMPLE 5

A 3-neck 2 liter flask equipped with a thermometer, water condenser, mechanical stirrer and 500 ml dropping funnel was charged with 899.8 g (6.616 moles) MeSi(OMe)$_3$ and 5.91 g (0.162 moles) concentrated HCl. The flask was heated to 60° C. and then 113.56 g (6.309 moles) H$_2$O and 267.98 g (8.37 moles) MeOH added via dropping funnel over the course of 1 hour, maintaining a pot temperature of 65°–70° C. by the rate of H$_2$O/MeOH addition. After refluxing 3½ hours, the flask was heated to 130° C., allowing 744 g volatiles to be taken off (strongly acidic). The acid number of the product was measured to be 0.2. Next, 2.2 g (0.026 mole) NaHCO$_3$ and 2.2 g diatomaceous earth were added to the product in the flask and the mixture stirred at room temperature 64 hours. The product was then pressure filtered. Acid number was measured to be less than 0.0002. The composition produced had the following average structure

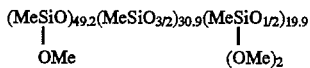

EXAMPLE 6

A 3-neck 50 ml flask equipped with a thermometer, magnetic stirrer, short path still, and nitrogen purge was charged with 14.89 g fluid from Example 5, 4.87 g (0.0420 moles) hydroxybutylvinylether and 0.2 g (0.0022 moles) tetraisopropyltitanate. The flask was heated to 85° C. for 4 hours during which time methanol by-product was taken off. The composition produced had the following average structure

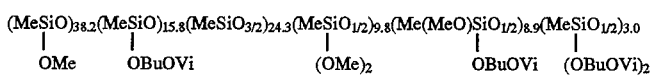

EXAMPLE 7

A 3-neck 50 ml flask equipped with a thermometer, magnetic stirrer, short path still, and nitrogen purge was charged with 14.89 g fluid from Example 5, 7.31 g (0.0630 moles) hydroxybutylvinylether and 0.22 g (0.0024 moles) tetraisopropyltitanate. The flask was heated to 85° C. for 4 hours during which time methanol by-product was taken off. The composition produced had the following average structure

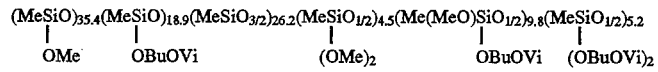

EXAMPLE 8

A 3-neck 50 ml flask equipped with a thermometer, magnetic stirrer, short path still, and nitrogen purge was charged with 14.89 g fluid from Example 5, 9.76 g (0.0841 moles) hydroxybutylvinylether and 0.25 g (0.0028 moles) tetraisopropyltitanate. The flask was heated to 85° C. for 7 hours during which time methanol by-product was taken off. The composition produced had the following average structure

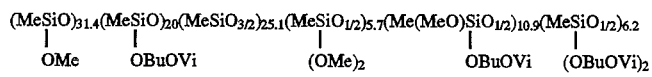

EXAMPLE 9

A 3-neck 50 ml flask equipped with a thermometer, magnetic stirrer, short path still, and nitrogen purge was charged with 14.89 g fluid from Example 5, 12.20 g (0.1052 moles) hydroxybutylvinylether and 0.26 g (0.0028 moles) tetraisopropyltitanate. The flask was heated to 85° C. for 14 hours during which time methanol by-product was taken off. The composition produced had the following average structure

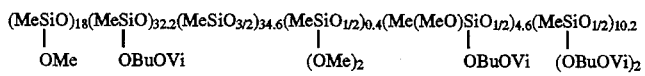

EXAMPLE 10

A 3-neck 50 ml flask equipped with a thermometer, magnetic stirrer, short path still, and nitrogen purge was charged with 14.89 g fluid from Example 5, 7.31 g (0.0630 moles) hydroxybutylvinylether and 0.21 g (0.0011 moles) barium hydroxide monohydrate. The flask was heated to 85° C. for 5 hours during which time methanol by-product was taken off. Product was then pressure filtered. The composition produced had the following average structure

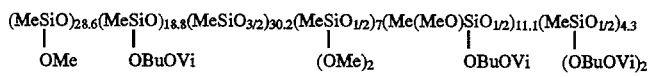

The following examples illustrate the effectiveness of the compositions of the present invention as release coatings.

EXAMPLE 11

The fluid of Example 1 was coated on biaxially orientated polypropylene with 2 wt % bisdodecylphenyl iodonium hexafluoroantimonate catalyst. The coated surface was exposed to 1556 mJ/cm$^2$ UV light and produced a clear, smooth coating with no rub off and no migration.

EXAMPLE 12

The fluid of Example 2 was coated on biaxially orientated polypropylene with 2 wt % bisdodecylphenyl iodonium hexafluoroantimonate catalyst. The coated surface was exposed to 835 mJ/cm$^2$ UV light and producted a clear, smooth coating with no rub off and no migration.

EXAMPLE 13

The fluid of Example 6 was coated on biaxially orientated polypropylene with 2 wt % bisdodecylphenyl iodonium hexafluoroantimonate catalyst. The coated surface was exposed to 312 mJ/cm$^2$ UV light and cured at approximately 125 ft/min using Fusion 600 Watt/inch H Bulb with no rub off and no migration.

EXAMPLE 14

The fluid of Example 7 was coated on biaxially orientated polypropylene with 2 wt % bisdodecylphenyl iodonium hexafluoroantimonate catalyst. The coated surface was exposed to less than 80 mJ/cm$^2$ UV light and cured at approximately 375 ft/min using Fusion 600 Watt/inch H Bulb with no rub off and no migration. Coated sheet was clear, smooth, with no odor.

EXAMPLE 15

The fluid of Example 8 was coated on biaxially orientated polypropylene with 2 wt % bisdodecylphenyl iodonium hexafluoroantimonate catalyst. The coated surface was exposed to 96 mJ/cm$^2$ UV light and cured at approximately 290 ft/min using Fusion 600 Watt/inch H Bulb with no rub off and no migration. Coated sheet was clear, smooth, with no odor.

EXAMPLE 16

The fluid of Example 8 was also evaluated for release against TESA 7475 (acrylic tape) and TESA 7476 (rubber tape) at 400 inches per minute. Release was evaluated at two different cure levels, 125 ft/min and 375 ft/min. The results are recorded in Table I below.

TABLE I

| Tape | Cure speed | Release | RMS* | SAS** |
|---|---|---|---|---|
| TESA 7475 | 125 ft/min | 131.8 g/in | 132.3 | 83.3 |
| TESA 7475 | 375 ft/min | 212.1 g/in | 221.5 | 87.5 |
| TESA 7476 | 125 ft/min | 121.9 g/in | 148.5 | 54.9 |
| TESA 7476 | 375 ft/min | 166.1 g/in | 184.6 | 48.7 |

*Root mean square, measured on high speed peel tester (Zpe 1.21)
**Subsequent adhesive strength, measured on low speed peel tester

EXAMPLE 17

The fluid of Example 9 was coated on biaxially orientated polypropylene with 2 wt % bisdodecylphenyl iodonium hexafluoroantimonate catalyst. The coated surface was exposed to less than 88 mJ/cm$^2$ UV light and cured at approximately 325 ft/min using Fusion 600 Watt/inch H Bulb with no rub off and no migration.

EXAMPLE 18

A three neck flask equipped with a mechanical stirrer, heating mantle, thermometer and condenser was loaded with 75 gms (4.17 moles) of H$_2$O, 74.88 gms (0.36 moles) of Si(OCH$_2$CH$_3$)$_4$, and 9.98 gms (0.086 moles) of HOCH$_2$CH$_2$CH$_2$CH$_2$OCH=CH$_2$. The flask was heated to 60° C. with agitation. 1.30 gms (0.0074 moles) of NH$_4$OH as a 20% by weight aqueous solution was added and heating maintained for 35 minutes. After 35 minutes 200 gms (1.24 moles) of (Me$_3$Si)$_2$NH was added slowly. Heating was maintained for an hour. Transferred to a separatory funnel and neutralized by washing several times with water. To aid in separation 80 gms (0.8 moles) of n-heptane was added during the final wash. The heptane resin layer was added to a flask and the heptane stipped off using a rotoevaporator. The product was a clear liquid resin.

EXAMPLE 19

The procedure of Example 18 was repeated the only difference was that 89.44 (0.43 moles) of Si(OCH$_2$CH$_3$)$_4$ was used instead of 78.44 gms (0.36 moles) and 90 gms (5.00 moles) of water. All other ratios were the same. The composition produced was a resin.

EXAMPLE 20

The resin of example 18 was was mixed with 2.0% by weight of bisdodecylphenyl iodonium hexafluoroantimonate catalyst and coated at approximately 1 micron thickness. Cure to no migration was accomplished after exposure to 963 mJ/cm$^2$ irradiation from a fusion UV processor equipped with a 600 Watt H bulb.

EXAMPLE 21

The resin of example 19 was mixed with 2.0% by weight of bisdodecylphenyl iodonium hexafluoroantimonate catalyst and coated at approximately 1 micron thickness. Cure to no migration was accomplished after exposure to 1174 mJ/cm$^2$ irradiation from a fusion UV processor equipped with a 600 H bulb.

Table II shown hereinbelow indicates the range of values of w, x, y, and z (in mole percents) in the compositions of the present invention produced by the methods of the present invention. The compositions of the present invention have the general formula:

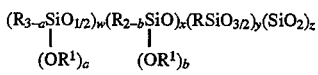

TABLE II

|   | Ex. 1 | Ex. 2 | Ex. 3 | Ex. 4 | Ex. 6 | Ex. 7 | Ex. 8 | Ex. 9 | Ex. 10 | Ex. 18 | Ex. 19 |
|---|---|---|---|---|---|---|---|---|---|---|---|
|   | | | | | Mole Percent | | | | | | |
| w | 19.0 | 23.9 | 5.0 | 0.012 | 21.7 | 19.5 | 23.1 | 15.2 | 22.4 | 22.50 | 25.75 |
| x | 72.2 | 67.1 | 93.5 | 99.988 | 54 | 54.3 | 51.4 | 50.2 | 47.4 | 0 | 0 |
| y | 8.8 | 9.0 | 1.5 | 0 | 24.3 | 26.2 | 25.5 | 34.6 | 30.2 | 0 | 0 |
| z | 0 | 0 | 0 | 0 | 0 | 0 | 0 | 0 | 0 | 77.50 | 74.25 |

It should be apparent from the foregoing that many other variations and modifications may be made in the compounds, compositions and methods described herein without departing substantially from the essential features and concepts of the present invention. Accordingly it should be clearly understood that the forms of the invention described herein are exemplary only and are not intended as limitations on the scope of the present invention as defined in the appended claims.

That which is claimed is:

1. A random siloxane polymer having its general formula selected from the group consisting of:

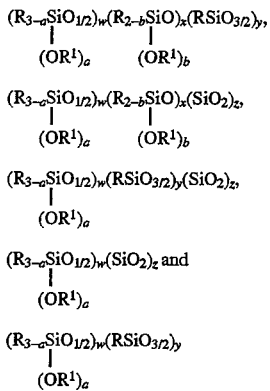

wherein R is a monovalent hydrocarbon radical or halohydrocarbon radical having from 1 to 20 carbon atoms, R$^1$ is a monovalent hydrocarbon or halohydrocarbon radical having from 1 to 8 carbon atoms or is a group having the formula —R$^2$OCH=CH$_2$ wherein R$^2$ is a divalent hydrocarbon or halohydrocarbon radical having from 1 to 20 carbon atoms, w is a mole percent of from greater than 0 to less than 100, x is a mole percent of from greater than 0 to less than 100, y is a mole percent of from greater than 0 to less than 100, z is a mole percent of from greater than 0 to less than 100, a is an integer of from 0 to 3, b is an integer of from 0 to 2, the sum of w+x+y, the sum of w+x+z, the sum of w+y+z, the sum of w+z, and the sum of w+y being equal to 100 mole percent, with the proviso that at least one —R$^2$OCH=CH$_2$ group exists in each molecule.

2. A polymer according to claim 1, wherein the polymer is a compound having its general formula selected from the group consisting of:

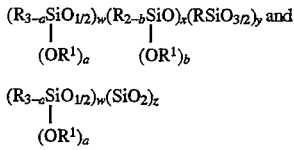

wherein R is a monovalent hydrocarbon radical or halohydrocarbon radical having from 1 to 20 carbon atoms, R$^1$ is a monovalent hydrocarbon or halohydrocarbon radical having from 1 to 8 carbon atoms or is a group having the formula —R$^2$OCH=CH$_2$ wherein R$^2$ is a divalent hydrocarbon or halohydrocarbon radical having from 1 to 20 carbon atoms, and wherein w, x, y, z, a, and b are as defined above.

3. A polymer according to claim 2, wherein the polymer is a compound having its general formula selected from the group consisting of:

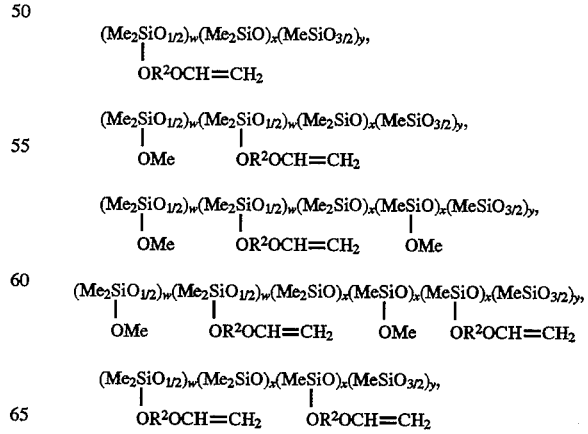

-continued

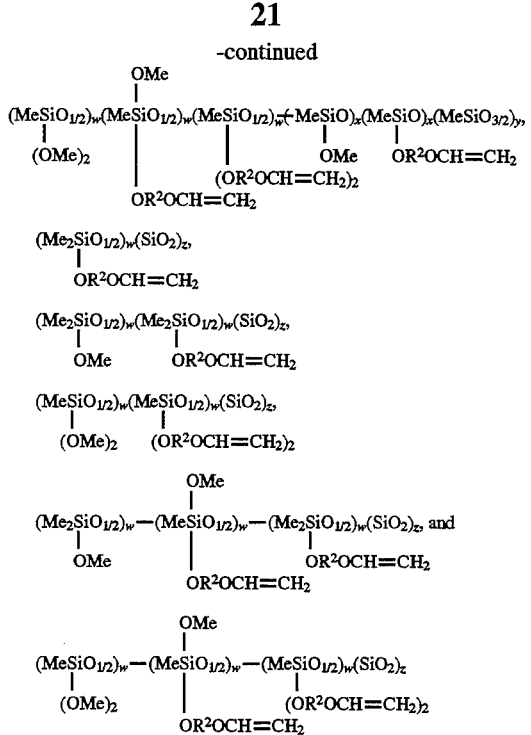

wherein w is a mole percent of from greater than 0 to less than 100, x is a mole percent of from greater than 0 to less than 100, y is a mole percent of from greater than 0 to less than 100, z is a mole percent of from greater than 0 to less than 100, the sum of w+x+y being equal to 100 mole percent, and the sum of w+z being equal to 100 mole percent.

4. A method of making a curable coating composition comprising mixing:

(A) a random siloxane polymer having its general formula selected from the group consisting of:

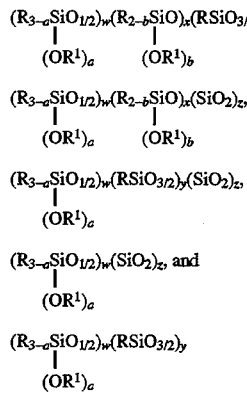

wherein R is a monovalent hydrocarbon radical or halohydrocarbon radical having from 1 to 20 carbon atoms, $R^1$ is a monovalent hydrocarbon or halohydrocarbon radical having from 1 to 8 carbon atoms or is a group having the formula —$R^2OCH=CH_2$ wherein $R^2$ is a divalent hydrocarbon or halohydrocarbon radical having from 1 to 20 carbon atoms, w is a mole percent of from greater than 0 to less than 100, x is a mole percent of from greater than 0 to less than 100, y is a mole percent of from greater than 0 to less than 100, z is a mole percent of from greater than 0 to less than 100, a is an integer of from 0 to 3, b is an integer of from 0 to 2, the sum of w+x+y, the sum of w+x+z, the sum of w+y+z, the sum of w+z, and the sum of w+y being equal to 100 mole percent, with the proviso that at least one —$R^2OCH=CH_2$ group exists in each molecule; and (B) a photocleavable acid selected from the group consisting of an onium salt having its formula selected from the group consisting of $R_2I^+MX_n^-$, $R_3S^+MX_n^-$, $R_3Se^+MX_n^-$, $R_4P^+MX_n^-$, and $R_4N^+MX_n^-$ wherein each R is independently an organic radical having from 1 to 30 carbon atoms, and $MX_n^-$ is a non-basic, non-nucleophilic anion and nitrobenzyl sulfonate esters.

5. A method according to claim 4, wherein (A) is a compound having its general formula selected from the group consisting of:

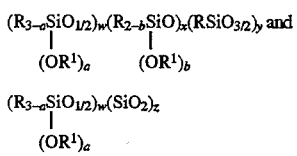

wherein R is a monovalent hydrocarbon radical or halohydrocarbon radical having from 1 to 20 carbon atoms, $R^1$ is a monovalent hydrocarbon or halohydrocarbon radical having from 1 to 8 carbon atoms or is a group having the formula —$R^2OCH=CH_2$ wherein $R^2$ is a divalent hydrocarbon or halohydrocarbon radical having from 1 to 20 carbon atoms, and wherein w, x, y, z, a, and b are as defined above.

6. A method according to claim 5, wherein (A) is a compound having its general formula selected from the group consisting of:

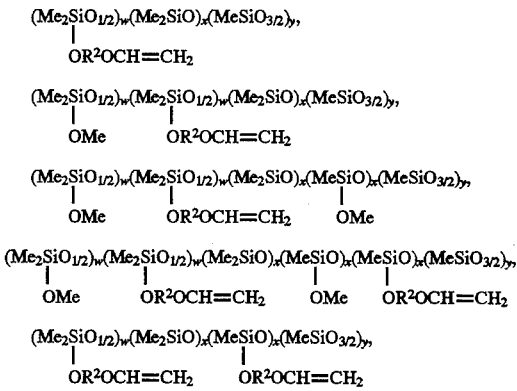

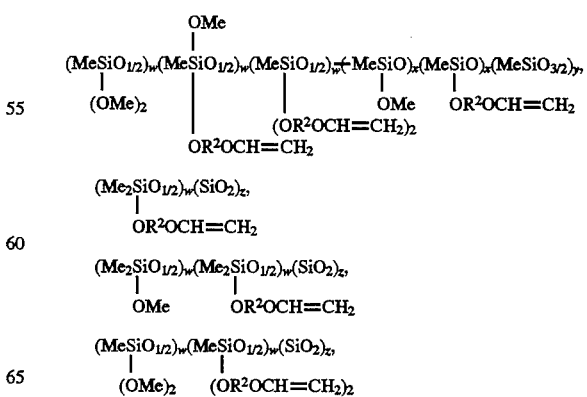

-continued

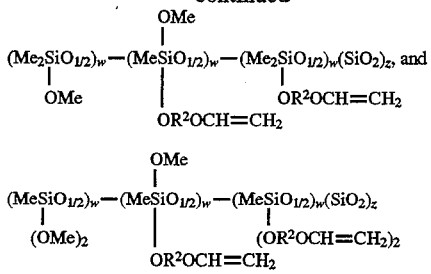

wherein w is a mole percent of from greater than 0 to less than 100, x is a mole percent of from greater than 0 to less than 100, y is a mole percent of from greater than 0 to less than 100, z is a mole percent of from greater than 0 to less than 100, the sum of w+x+y being equal to 100 mole percent, and the sum of w+z being equal to 100 mole percent.

7. A curable coating composition produced in accordance with the method of claim 6.

8. A curable coating composition produced in accordance with the method of claim 5.

9. A method according to claim 4, wherein $MX_n^-$ is selected from the group consisting of $BF_4^-$, $PF_6^-$, $AsF_6^-$, $SbF_6^-$, $SbCl_6^-$, $HSO_4^-$, $ClO_4^-$, and $SnCl_6^-$.

10. A method according to claim 4, wherein (B) is selected from the group consisting of bis(dodecylphenyl) iodonium hexafluoroarsenate, bis(dodecylphenyl) iodonium hexafluoroantimonate, and dialkylphenyl iodonium hexafluoroantimonate.

11. A curable coating composition produced in accordance with the method of claim 10.

12. A curable coating composition produced in accordance with the method of claim 4.

13. A coated article prepared by a method comprising the steps of:
(I) applying a composition to a solid substrate, said composition prepared by mixing:
(A) a random siloxane polymer having its general formula selected from the group consisting of:

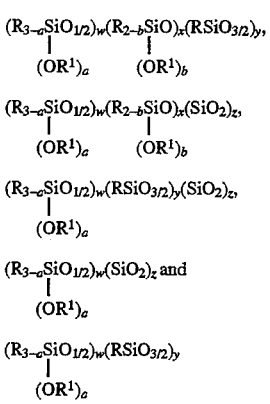

wherein R is a monovalent hydrocarbon radical or halohydrocarbon radical having from 1 to 20 carbon atoms, $R^1$ is a monovalent hydrocarbon or halohydrocarbon radical having from 1 to 8 carbon atoms or is a group having the formula $-R^2OCH=CH_2$ wherein $R^2$ is a divalent hydrocarbon or halohydrocarbon radical having from 1 to 20 carbon atoms, w is a mole percent of from greater than 0 to less than 100, x is a mole percent of from greater than 0 to less than 100, y is a mole percent of from greater than 0 to less than 100, z is a mole percent of from greater than 0 to less than 100, a is an integer of from 0 to 3, b is an integer of from 0 to 2, the sum of w+x+y, the sum of w+x+z, the sum of w+y+z, the sum of w+z, and the sum of w+y being equal to 100 mole percent, with the proviso that at least one $-R^2OCH=CH_2$ group exists in each molecule; and (B) a photocleavable acid selected from the group consisting of an onium salt having its formula selected from the group consisting of $R_2I^+MX_n^-$, $R_3S^+MX_n^-$, $R_3Se^+MX_n^-$, $R_4P^+MX_n^-$, and $R_4N^+MX_n^-$ wherein each R is independently an organic radical having from 1 to 30 carbon atoms, and $MX_n^-$ is a non-basic, non-nucleophilic anion and nitrobenzyl sulfonate esters; and (II) exposing the coating to an energy source selected from the group consisting of (i) actinic radiation and (ii) actinic radiation in combination with heat in an amount sufficient to cure the coating.

14. An article according to claim 13, wherein the method further comprises contacting a pressure sensitive adhesive composition with the substrate after step (II).

15. An article according to claim 13, wherein (A) is a compound having its general formula selected from the group consisting of:

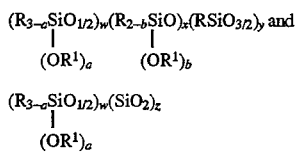

wherein R is a monovalent hydrocarbon radical or halohydrocarbon radical having from 1 to 20 carbon atoms, $R^1$ is a monovalent hydrocarbon or halohydrocarbon radical having from 1 to 8 carbon atoms or is a group having the formula $-R^2OCH=CH_2$ wherein $R^2$ is a divalent hydrocarbon or halohydrocarbon radical having from 1 to 20 carbon atoms, and wherein w, x, y, z, a, and b are as defined above.

16. An article according to claim 15, wherein (A) is a compound having its general formula selected from the group consisting of:

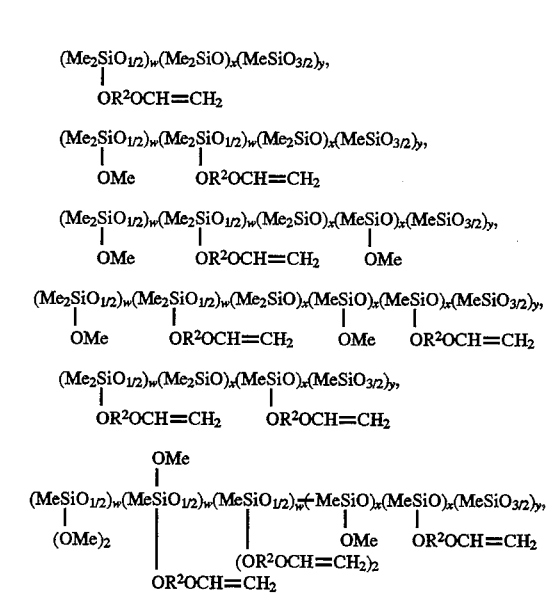

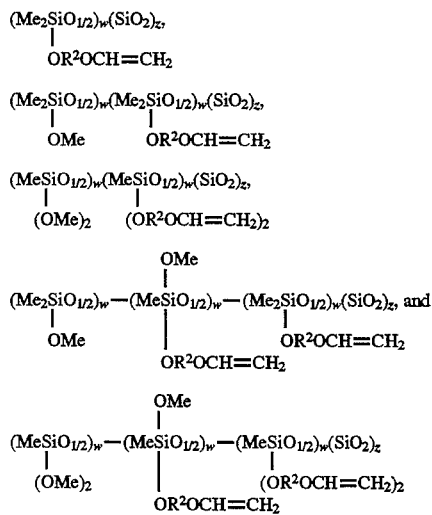

wherein w is a mole percent of from greater than 0 to less than 100, x is a mole percent of from greater than 0 to less than 100, y is a mole percent of from greater than 0 to less than 100, z is a mole percent of from greater than 0 to less than 100, the sum of w+x+y being equal to 100 mole percent, and the sum of w+z being equal to 100 mole percent.

17. An article according to claim 13, wherein (B) is selected from the group consisting of bis(dodecylphenyl) iodonium hexafluoroarsenate, bis(dodecylphenyl) iodonium hexafluoroantimonate, and dialkylphenyl iodonium hexafluoroantimonate.

18. An article according to claim 13, wherein the substrate is paper.

19. An article according to claim 13, wherein the substrate is plastic film.

20. An article according to claim 13, wherein the actinic radiation is selected from ultraviolet light and electron beam radiation.

* * * * *